United States Patent [19]

Pretzer

[11] 4,167,910
[45] Sep. 18, 1979

[54] TRANSPLANTING APPARATUS FOR DEPOSITING PLANTS DIRECTLY FROM A SUPPLY TAPE INTO AN INCLINED FURROW

[75] Inventor: Paul R. Pretzer, Brooklyn Heights Village, Ohio

[73] Assignee: General Mills, Inc., Minneapolis, Minn.

[21] Appl. No.: 826,809

[22] Filed: Aug. 22, 1977

[51] Int. Cl.² ............................................. A01C 11/02
[52] U.S. Cl. ......................................... 111/3; 111/81; 111/DIG. 1
[58] Field of Search ............................. 111/2, 3; 47/56

[56] References Cited

U.S. PATENT DOCUMENTS

| 1,058,396 | 4/1913 | Weir | 111/3 X |
|---|---|---|---|
| 1,152,402 | 9/1915 | Draper | 111/2 |
| 1,495,328 | 5/1924 | Keppler | 111/3 |
| 1,522,702 | 1/1925 | Rosevear, Jr. | 111/3 |
| 1,678,643 | 7/1928 | Kassebeer | 111/3 |
| 2,935,957 | 5/1960 | Denton | 111/3 |
| 3,719,158 | 3/1973 | Roths | 111/2 |

FOREIGN PATENT DOCUMENTS

| 696988 | 1/1931 | France | 111/3 |
|---|---|---|---|
| 249399 | 7/1926 | Italy | 111/3 |
| 256496 | 12/1927 | Italy | 111/3 |
| 299485 | 8/1932 | Italy | 111/3 |
| 447901 | 5/1949 | Italy | 111/2 |
| 612228 | 11/1960 | Italy | 111/3 |
| 78162 | 2/1951 | Norway | 111/3 |
| 17485 | of 1914 | United Kingdom | 111/3 |
| 817157 | 7/1959 | United Kingdom | 47/56 |
| 513661 | 6/1976 | U.S.S.R. | 111/3 |

*Primary Examiner*—Edgar S. Burr
*Assistant Examiner*—Steven A. Bratlie
*Attorney, Agent, or Firm*—G. O. Enockson; L. M. Lillehaugen

[57] ABSTRACT

Supporting the forward end of a mobile frame is a rotatable drum having a number of sawtooth-shaped or beveled ribs extending circumferentially around the drum. Owing to the sawtooth configuration of the circumferential ribs, each rib opens a furrow having a sloping side and a vertical side. A plant supply tape is employed, one for each furrow to be formed, which has a series of resilient blocks secured to a nonstretchable flexible belt, the root ends of the plants to be transplanted being releasably held in the slits between adjacent blocks. A roller mechanism changes the direction of tape travel directly over the sloping side of the furrow being supplied with plants from the tape so that each slit is opened to deposit a plant on the sloping side of the furrow. A scraper blade, one for each furrow, extends downwardly from the frame to backfill the furrow immediately after several plants have been dropped therein.

5 Claims, 8 Drawing Figures

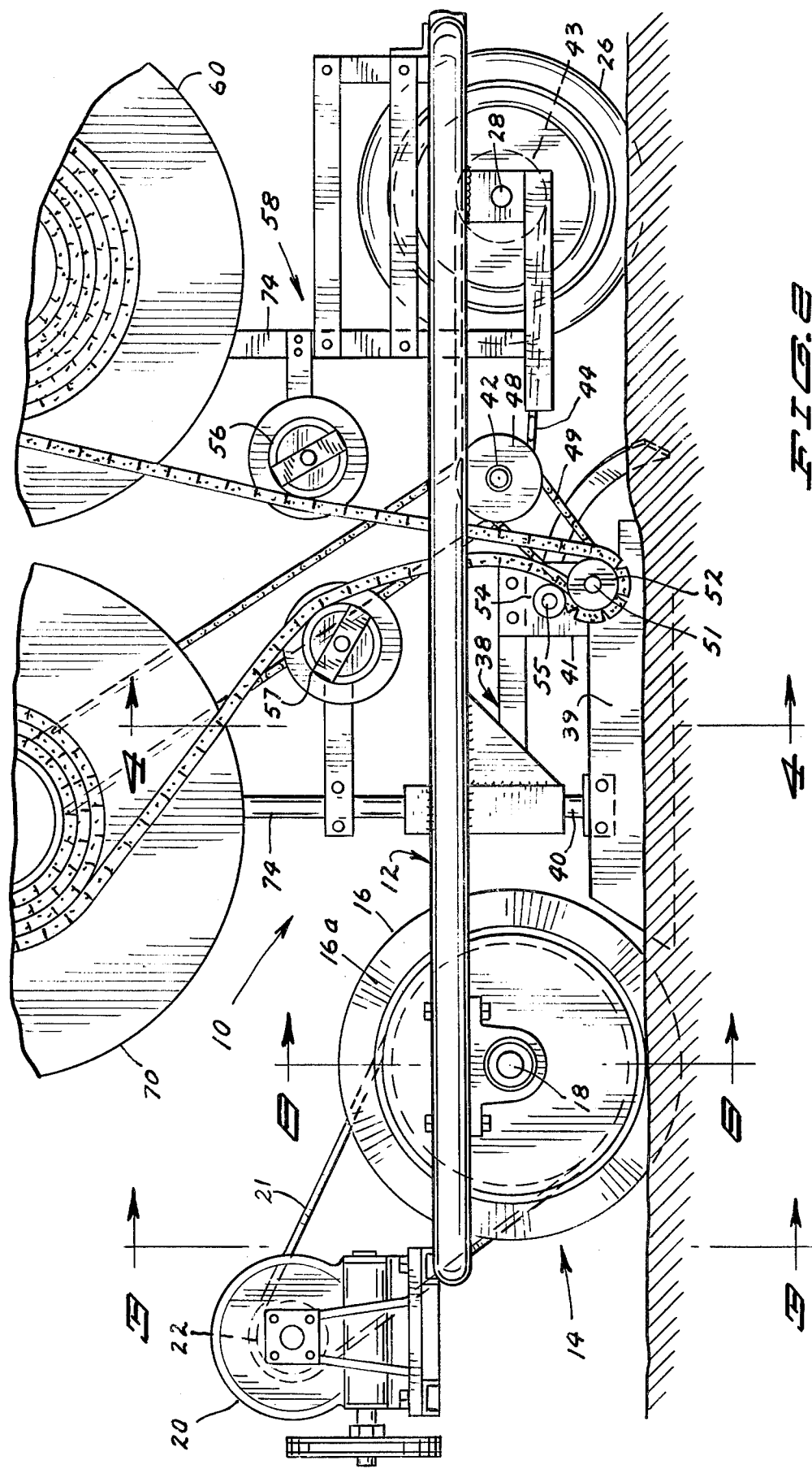

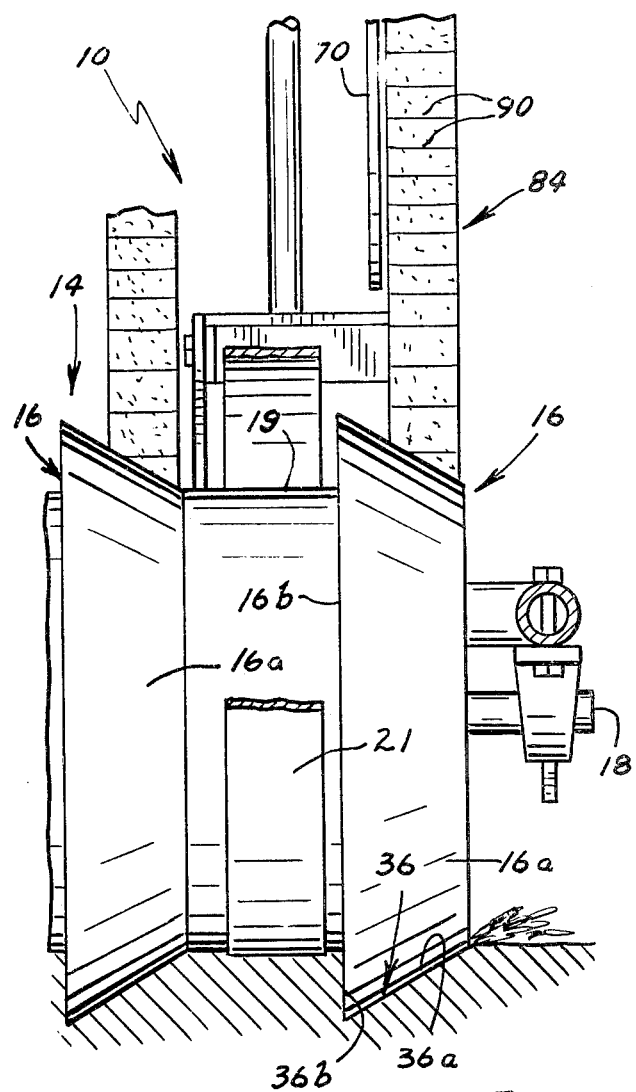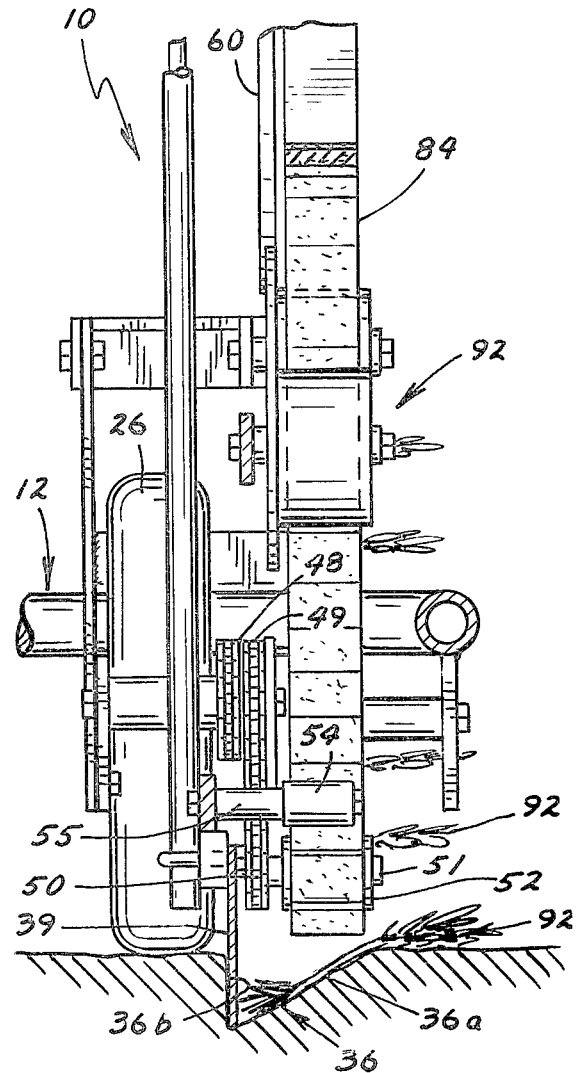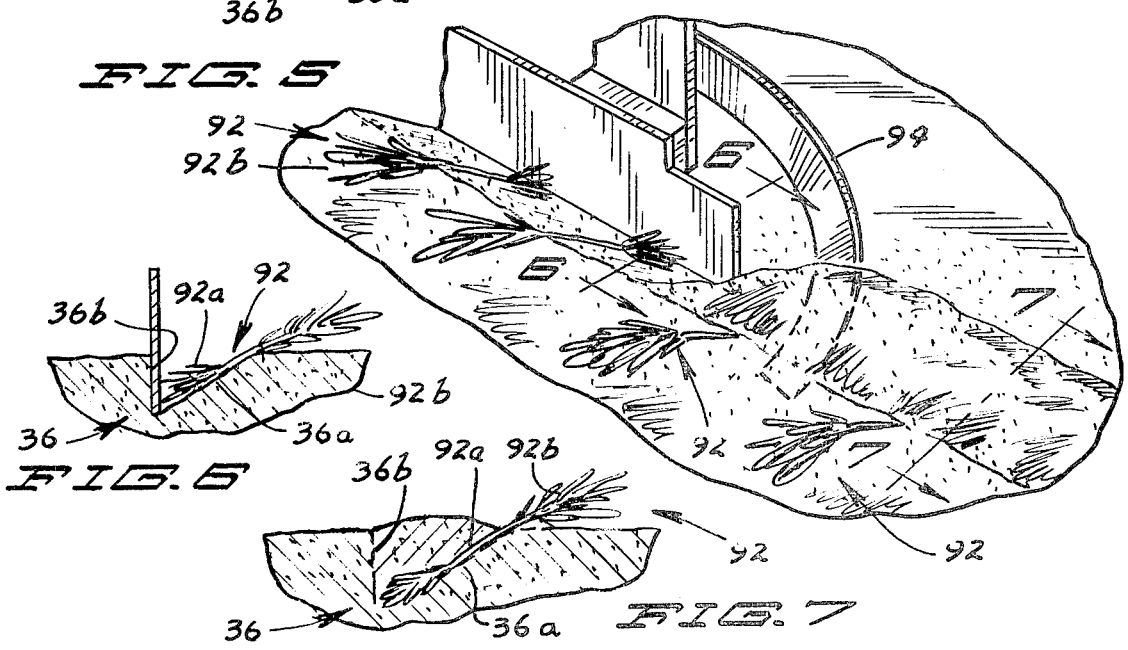

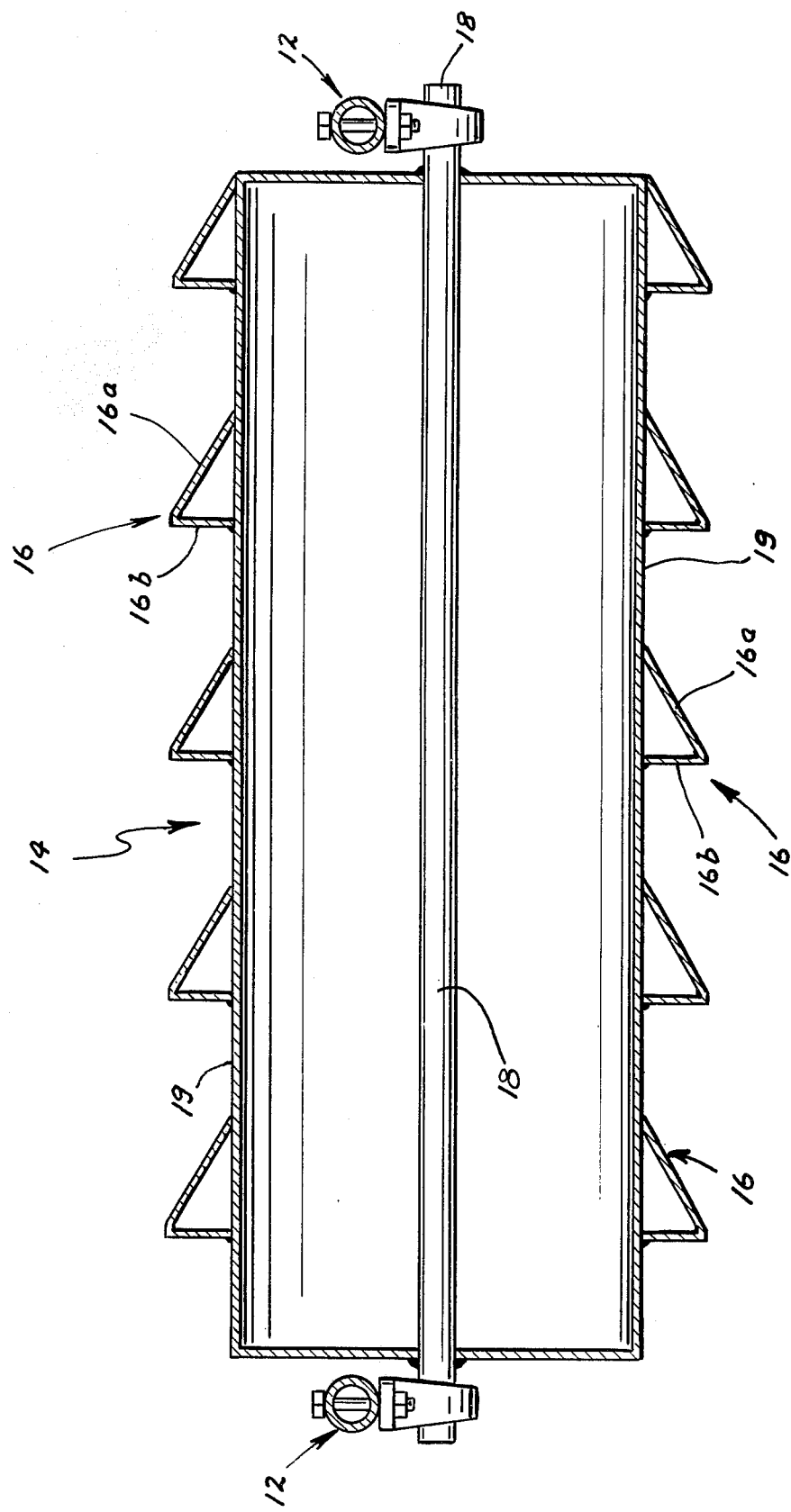

TRANSPLANTING APPARATUS FOR DEPOSITING PLANTS DIRECTLY FROM A SUPPLY TAPE INTO AN INCLINED FURROW

BACKGROUND OF THE INVENTION

1. Field of the Invention

This invention relates generally to apparatus for transplanting small plants, and pertains more particularly to apparatus for successively depositing plants directly from a supply tape into a furrow.

2. Description of the Prior Art

Some types of plants, such as bibb lettuce, are quite fragile and must be carefully transplanted. While manual transplanting, if done properly, can avoid damage to delicate plants, this procedure has become archaic because it is both tedious and costly. Automatic transplanters with which I am acquainted are deficient in that they cannot be depended upon to transplant frail plants with the degree of care that must be exercised to assure their growth after having been transplanted, and at the same time perform the task sufficiently rapidly so as to render the operation economical.

SUMMARY OF THE INVENTION

Therefore, the present invention has for an important object the transplanting of small plants with minimal damage thereto. In this regard, an aim of the invention is to provide apparatus that requires less handling of the plants than heretofore, employing a successive transfer of the plants directly from a supply tape into a furrow.

Another object of the invention is to provide a better control of the depth at which the plants are transplanted. More specifically, the present invention envisages the formation of a sawtooth-like furrow having a sloping side and a vertical side of predetermined dimensions. The plants are deposited on the sloping side adjacent the bottom of the furrow. Because the furrow sides are accurately formed, and the dimensions preserved until each plant has been deposited, the depth of planting is precisely controlled.

A further object, which is closely allied with the preceding object, is to provide more leeway or latitude in backfilling the furrow. In this regard, it is vital that the heart or growing tip of plants, such as bibb lettuce, not be covered with soil or the fragile plant will die. More specifically, the growing tip from where new leaves sprout, is only a fraction of an inch away from the locus where the already formed leaves are attached to the stem. Owing to the shape of the furrow formed when practicing my invention, the covering over of this vulnerable portion of the plant can be readily avoided. Stated somewhat differently, my invention obviates the criticalness normally associated with the transplanting of plants in the usual crevice-type furrow.

Another object of the invention is to avoid the need for transplanting plants in a vertically oriented position. In the past, to maintain a plant vertical the furrow had to be quite deep, assuming the appearance of a small crevice or sharp "V". If the plant is placed too deep in such a furrow, the heart or growing tip is apt to be covered as explained above. On the other hand, if the plant is placed too shallow, it can topple over by virtue of the weight of its leaves. Of course, the severity and frequency of this happening depends upon the species of plant, as well as the type of soil for some soils, such as those containing sand, tend to cave in more readily, thereby preventing the roots from being planted deep enough to keep the plant vertical. Nonetheless, the avoidance of this for all plants is another advantage of my invention.

Still another object of the invention is to make use of a plant supply tape that can be readily loaded with plants in advance of its use, and later placed on the apparatus when the transplanting is to be done.

Another object is to vary the spacing between plants that are transplanted, it being only necessary to change the speed of the plant supply tape in relation to the ground speed of the apparatus.

Yet another object is to provide simple transplanting apparatus that does not depend upon any synchronization of components, thereby not only lowering the cost of my equipment, as contrasted with certain prior art equipment, but additionally providing apparatus that will be rugged and reliable.

Also, the invention has for a further object the provision of transplanting apparatus that is compact, thereby rendering it more maneuverable during use, and more readily transported from field to field.

Still further, an object is to provide transplanting apparatus that lends itself to multiple row transplanting in that the drum, which supports the forward end of the frame, can be provided with a number of furrow-forming ribs.

Another object of the invention is to employ a ribbed drum to form multiple furrows in which the drum functions as the traction member, thereby eliminating soil compaction and tractor wheel marks with the consequence that plants can be more solidly transplanted.

Also, an object is to transplant a variety of plants, whether fragile or rugged, in that only the roots need be held and not the leaves or foliage.

Yet further, the invention has for an additional object the provision of transplanting apparatus that does not require any great amount of power for its operation, thereby enabling it to be either self-propelled or pulled by a small tractor. In this regard, a choice can be made as to how the equipment is to be designed, and thus provide the ultimate purchaser with a choice best suited to his particular needs.

Briefly stated, my invention contemplates the use of a mobile frame having a cylindrical drum rotatably mounted at its forward end, the drum being provided with a plurality of beveled ribs extending circumferentially therearound. The ribs have a triangular or sawtooth shape when viewed in section, each rib in this way forming a furrow having a sloping side and a vertical side. A plant supply tape is coiled on a first reel and rewound on a second reel. By means of a roller the direction in which the tape moves in passing from the first reel to the second reel is changed just above the sloping side of the furrow served by that particular tape. The normally closed slits between the resilient blocks which hold the various plants to be transplanted are opened by reason of the change in tape direction so that each plant is allowed to drop onto the sloping furrow side. Provision is made for maintaining the furrow open until after the plant has been deposited. It is only then that the furrow is closed by a scraper blade that backfills the furrow, doing so from the vertical side thereof, and in a manner so as not to cover the hearts or growing tips. In this way, relatively fragile plants are carefully handled by the apparatus at all times, being deposited directly into the specially configured furrow and then properly covered, all without damage to the plants.

BRIEF DESCRIPTION OF THE DRAWINGS

FIG. 1 is a perspective view taken from one side of simplified transplanting apparatus constructed in accordance with the teachings of my invention;

FIG. 3 is a fragmentary front elevational view taken in the direction of line 3—3 in FIG. 2 in order to show two of the beveled or sawtooth ribs and the two furrows formed thereby;

FIG. 4 is a sectional view taken in the direction of line 4—4 of FIG. 2 for the purpose of depicting the manner in which the plants are successively deposited onto the sloping side of a furrow;

FIG. 5 is a detailed perspective view looking downwardly onto the scraper blade which backfills or covers the roots of the deposited plants;

FIG. 6 is a sectional view taken in the direction of line 6—6 in FIG. 5 showing a plant that has just been deposited;

FIG. 7 is a sectional view taken in the direction of line 7—7 in FIG. 5 after the furrow in FIG. 6 has been backfilled to cover the root end of the plant, and FIG. 8 is a sectional view taken in the direction of line 8—8 in FIG. 2 for the purpose of showing a complete drum having five furrow-forming ribs thereon in contrast to the two ribs appearing on the fragmentarily pictured drum in FIG. 3.

DESCRIPTION OF THE PREFERRED EMBODIMENT

Figure 2:
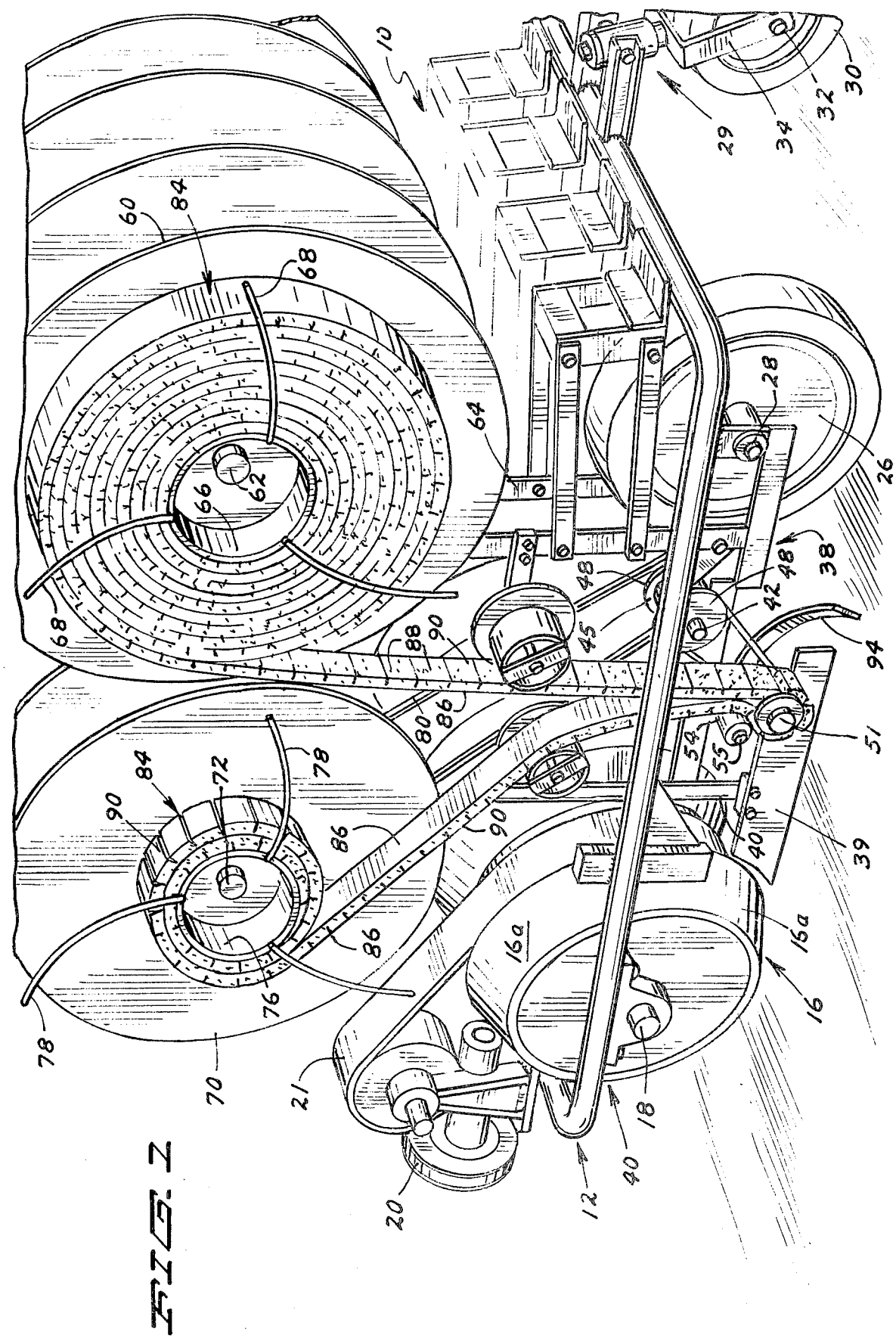
FIG. 2 is a side elevational view of the lower portion of the apparatus of FIG. 1, the view being taken from the same side as in FIG. 1.

The simplified embodiment of my transplanting apparatus selected for illustration has been designated in its entirety by the reference numeral 10. The apparatus 10 includes a tubular rectangular frame 12. A drum 14 having a number (five as can be seen from FIG. 8) of beveled or sawtooth-shaped ribs 16 supports the forward end of the frame 12, there being a shaft 18 on which the drum 14 is journaled for rotation beneath the frame 12, the ends of the shaft 18 being rotatable in suitable bearings attached to the underside of the frame 12. More specifically, the ribs 16 each include a sloping wall 16a and a vertical wall 16b. As will be seen in FIG. 8, the five ribs 16 have cylindrical circumferential portions 19 therebetween.

Because the apparatus 10 is both compact and lightweight, it lends itself readily to being self-propelled. Accordingly, inasmuch as only a small amount of power is needed, an internal combustion engine 20 is mounted on the forward end of the frame 12, there being a belt 21 entrained about a pulley 22 on the engine 20 and about one of the cylindrical portions 19 of the drum 14. In this way, the drum 14 not only supports the forward end of the frame 12 but acts as the traction member to advance the apparatus 10 across a strip of soil to be planted, thus avoiding soil compaction and tractor wheel marks that would interfere with the transplanting of plants.

Whereas the drum 14 supports the forward end of the frame 12, a series of laterally spaced wheels 26 (only one being shown) mounted on a transverse shaft 28 supports the rear end of the frame 12. Additionally, a caster 29 is employed which includes a wheel 30 journaled for rotation on a short transverse shaft 32 extending between the lower ends of a fork 34. The fork 34 is mounted for swivel movement about a generally vertical axis.

Inasmuch as the ribs 16 (there being five as shown in FIG. 8) on the drum 14 form multiple furrows identical to each other, only a single furrow 36 need be described, the furrow 36 having a sloping side 36a and a vertical side 36b. Since the number of furrows 36 is largely a matter of choice, as already indicated, it will obviously be simpler and more straightforward to show and refer to only those components for transplanting a single row of plants, in, of course, a single furrow 36.

Accordingly, an auxiliary substructure 38 is attached beneath the frame 12 in order to mount the components now to be referred to. In this regard, a landside 39 (actually one for each furrow) depends from this structure 38, there being a vertical rod 40 at the forward end and a bracket 41 at the rear, these members retaining the landside 39 in the same vertical plane as the vertical wall 16b of the rib 16 on the drum 14 which it trails.

Also supported by the auxiliary substructure 38 is a transverse shaft 42. The shaft 42 is driven by a sprocket 43 on the shaft 28 through the agency of a chain 44 and a sprocket 45 on the shaft 42. Thus, when the shaft 28 is caused to rotate by reason of the rear wheels 26 (only one having been shown, as already explained) rotating, the shaft 42 rotates. A sprocket 48 is keyed to the shaft 42 and a chain 49 extends about the sprocket 48 and a sprocket 50 on a shaft 51.

The shaft 51 has keyed thereto a roller 52 performing a diverting or deflecting function presently to be described. Associated with the deflection roller 52 is an idler roller 54 mounted on a shaft 55, which is preferably spring loaded so that the roller 54 is urged or biased in the direction of the roller 52. A pair of spaced guide rollers 56, 57 are journaled on superstructure denoted generally by the reference numeral 58 mounted on the frame 12, the guide rollers 56, 57 being at an elevation above the deflection roller 52.

At this time, attention is directed to a tape supply reel 60 (here again one for each furrow in actual practice) mounted on a shaft 62 supported by a mast 64 extending upwardly from the frame 12. The tape supply reel 60 has a hub 66. Rods 68 extend radially from the hub 66 for a purpose better reserved for later discussion.

Similar to the tape supply reel 60 is a tape rewind reel 70 (also one for each furrow), the reel 70 being mounted on a shaft 72 at the upper end of a second mast 74 extending upwardly from the frame 12. Here again, a hub 76 is employed. Rods 78 extend radially from the hub 76 performing the same function as the rods 68. Unlike the supply reel 60, the rewind reel 70 is rotated by means of a belt 80 driven with slipping tension from the earlier-mentioned shaft 42.

Somewhat similar to the tape employed in U.S. Pat. No. 3,719,158, granted Mar. 6, 1973 to Herbert C. O. Roths for "Transplanting Machine", is a plant supply tape 84. The tape 84 is of simpler construction, however, than in the alluded-to patent in that no grommetted sprocket holes are contemplated. In this instance, the tape 84 comprises a flexible belt or backing strip 86 to which a series of soft, resilient blocks 88 of suitable elastomeric material are secured, there being a slit 90 between each two adjacent blocks 88.

In each slit 90 is releasably held a plant 92, more specifically its root end labeled 92a which is better seen in FIGS. 6 and 7 (although FIGS. 6 and 7 are concerned with the plants after they have been dropped or deposited). The leaf or foliage end has been denoted by the reference numeral 92b, this end projecting from each slit 90 until release of the root end 92a. While my invention will find especial utility in the transplanting of bibb lettuce plants or some fragile plant similar thereto, the plants 92 that have been pictured are not intended to represent any particular plant species. The tape 84, it will be appreciated, can be pre-loaded with the plants 92 in advance of the time that the transplanting is actually to take place.

Further included in the apparatus 10 is a curved scraper blade 94 mounted at its upper end to a portion of the auxiliary structure 38, more specifically the bracket 41 supporting the rear end of the landside 39. The scraper blade 94 backfills the furrow 36 formed by the leading wheel 14.

OPERATION

Having presented the foregoing description, the manner in which my apparatus 10 transplants the plants 92 in the furrow 36 should be readily understandable. Assuming that the plants 92 have been previously inserted into the various slits 90 of the plant supply tape 84 and that the tape has been coiled onto the hub 66 of the supply reel 60, the curved rods 68 prevent any dislodgement of the tape 84 other than in a radial or tangential direction from the reel 60. The leading end of the supply tape 84 is then advanced downwardly over the guide roller 56, beneath the deflection roller 52, up past the guide roller 57 to the hub 76 of the rewind reel 70.

With the foregoing accomplished, the apparatus 10 is in readiness for performing a transplanting operation. All that need be done is to propel the apparatus 10, using the engine 20 in the illustrated situation, in a direction to the left as viewed in FIGS. 1 and 2. The drum 14, more specifically one rib 16, forms the furrow 36 having the sloping side 36a and the vertical side 36b. The remaining ribs 16 produce additional furrows. In this regard, the sloping wall 16a forms the sloping side 36a and the vertical wall 16b the vertical side 36b. In actual practice, for the transplanting of bibb lettuce a distance of four inches from the top or upper edge of the sloping side 36a to the bottom or lower edge (the juncture of the two sides 36a, 36b) has proved effective; a distance or depth of two inches from the top or upper edge of the vertical side to the bottom juncture has also contributed to good plant growth.

It will be appreciated that the landside 39 prevents the vertical side 36b of the furrow 36 from collapsing or caving in prior to the gravitational deposit of a plant 92 on the sloping side 36a. It will be appreciated from FIG. 4 that the deflection roller 52 is directly above a portion of the sloping side 36a of the furrow 36 and thus when the tape 84 is flexed sufficiently, that is its direction changed, by the deflection roller 52, the particular slit 90 that is lowermost opens and gravitationally releases the particular plant 92 so that its root end 92a drops onto the sloping side 36a of the furrow 36.

In this way, successive plants 92 are deposited on the sloping side 36a of the furrow 36 as the slits 90 pass beneath the deflection roller 52 and are at this time flexed open. As can be readily seen from FIG. 6, the root end 92a of each plant 92 is closely adjacent the bottom of the furrow 36, the bottom being where the sloping side 36a meets the bottom of the vertical side 36b, or, in other words, where the two sides 36a, 36b join each other. Furthermore, owing to the fact that the slits 90 extend at right angles to the direction the apparatus 10 travels, the plants 92 are deposited perpendicularly to the bottom or lower edges of the sides 36a, 36b. If the depth of the furrow 36 is two inches, this figure having already been mentioned as a preferred depth for partially mature bibb lettuce, then this depth of transplanting is continuously adhered to throughout the entire length of the furrow 36. This precise control of the depth is a distinct advantage. The landside 39 is adjustable vertically to maintain the requisite furrow depth until the furrow is filled by the scraper blade 94, as explained below.

The spacing between deposited plants 92 will, of course, depend upon the spacing of the slits 90 between the blocks 88 of the supply tape 84. The spacing also depends upon the speed at which the tape 84 is moved in relation to the speed at which the apparatus is moved across the ground. This change in spacing can easily be realized by altering the speed at which the roller 52 rotates, such as by changing the size of the sprocket 48 on the shaft 42. Inasmuch as the tape rewind reel 70 is driven by means of the belt 80, the belt 80 having slipping tension with the shaft 42, as previously mentioned herein, the rewind or takeup reel 70 can be driven at a speed sufficient for the greatest rotative speed of the roller 52 that might be employed, the belt 80 slipping for lesser speeds.

The scraper blade 94 trails behind the landside 39, functioning to fill in the furrow 36 and doing so from the side at which the landside 39 is located. Thus, by scooping in soil from only the vertical side 36b of the furrow 36, only the root ends 92a of the deposited plants 92 are covered and the leaf ends 92b are not disturbed. Consequently, the heart or growing tip from whence new leaves sprout can be left exposed and the plant will not die as would be the case if this highly critical region were covered. Because of the angle at which the plants are deposited it should be recognized that the divergence or sawtooth shape imparted to the furrow causes the soil to rise more rapidly near the bottom and that this rise decreases as the furrow gets wider toward the top. Since more soil is required at the top the rate at which the furrow is filled is less at the top, and this slower rate permits a far better control with respect to leaving the heart or growing tip exposed than where the furrow has a crevice-like shape as in the past.

Although believed obvious, the depth of the furrow 36 will depend upon the type of plant 92 to be transplanted. As already explained, when transplanting bibb lettuce, a sloping side 36a of four inches and a vertical side 36b of two inches have been found to be satisfactory. To open a furrow 36 having these dimensions, the sloping wall 16a of the rib 16 would have a width of four inches and the vertical wall 16b thereof a radial distance of two inches. It should be appreciated, though, that whatever dimensions are given to the rib 16, such dimensions will dictate the depth of transplant for the plants 92. By using the drum 14 the depth can be controlled accurately, for the cylindrical portions 18c, which roll along the ground's surface allow the ribs 16 to enter the soil only to the depth determined by the vertical walls 16b and the circumferential portions 19. Consequently, a very precise control of the planting depth is realized when practicing my invention which can be extremely important, as already explained.

Also, it will be recognized that the plants 92, which is especially important with frail varieties of plants, such as bibb lettuce, are gently held by the supply tape 84. Furthermore, there is no rough transfer from one mechanism to another as in the past. Instead, the individual plants 92 are successively dropped directly from the supply tape 84 into the furrow 36 with their axes perpendicular to the direction in which the apparatus 10 travels and hence perpendicular to the lower edges of the furrow sides 36*a*, 36*b*. The root ends 92*a* are then covered with soil without damaging either these ends 92*a* or the foliage ends 92*b*.

I claim:

1. Transplanting apparatus comprising a mobile frame adapted to traverse a strip of soil to be planted, furrow-forming roller means having a sloping wall and a vertical wall carried by said frame for forming a furrow having a sloping side and a vertical side, a supply tape on said frame having a series of resilient blocks thereon of lesser width than said furrow-forming means with a slit between adjacent blocks, the plants to be transplanted being held in said slits, means for directing said supply tape downwardly toward said furrow at a location rearwardly of said furrow-forming roller means with the nearer edges of said blocks being laterally offset in the direction of said sloping wall with respect to the vertical plane of said vertical wall and with said slits oriented transversely to said vertical wall, a member suspended from said frame for changing the direction of tape movement over the sloping side of the furrow formed by said furrow-forming roller means for successively depositing plants transversely onto the sloping side of the furrow as the apparatus moves along said strip, and means carried by said frame spaced rearwardly from said direction-changing member for backfilling said furrow only from its vertical side, whereby the plants are so positioned so that the roots are covered but not the tops.

2. The transplanting apparatus of claim 1 in which said furrow-forming roller means constitutes a generally cylindrical drum having a circumferential rib thereon forming said sloping wall and said vertical wall.

3. The transplanting apparatus of claim 2 in which said drum is provided with additional ribs, each having a sloping wall and a vertical wall to form additional furrows.

4. The transplanting apparatus of claim 1 in which said means for backfilling said furrow includes a scraper blade extending downwardly from said frame with its lower end slightly offset in an opposite direction from said sloping wall with respect to the vertical plane of said vertical wall as are said nearer edges of said blocks in order to backfill said furrow only from its said vertical side.

5. The transplanting apparatus of claim 4 including a landside mounted on said frame in substantially the same vertical plane as said vertical wall, said landside extending rearwardly from said vertical wall past said direction-changing member but terminating forwardly of the lower end of said scraper blade.

* * * * *